June 17, 1941.  A. W. LAIRD  2,245,864
RAILWAY CAR TRUCK
Filed Aug. 30, 1940    2 Sheets-Sheet 1
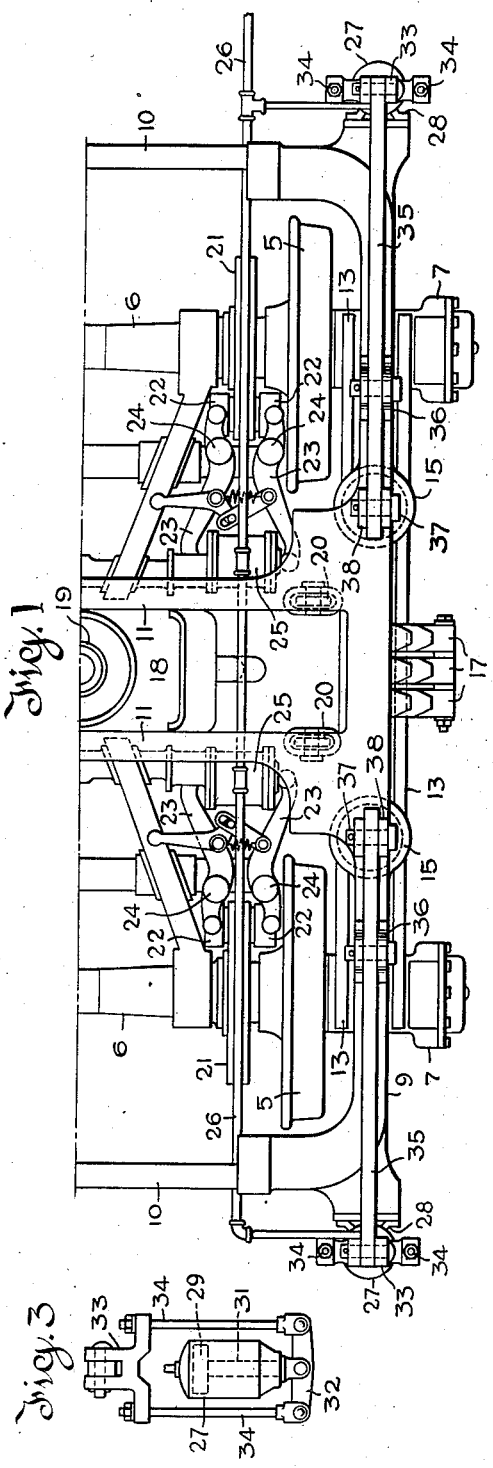
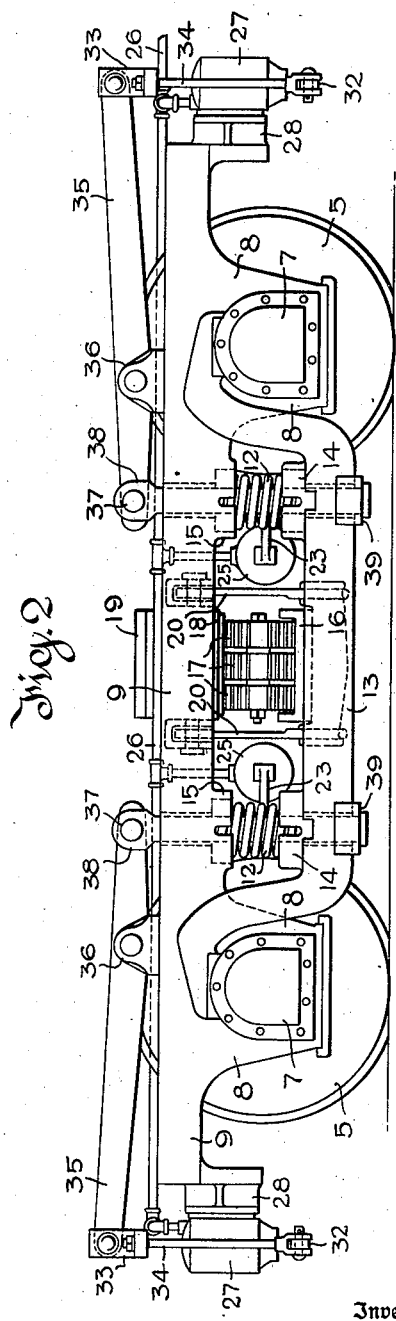
Inventor
Alton W. Laird
Attorneys

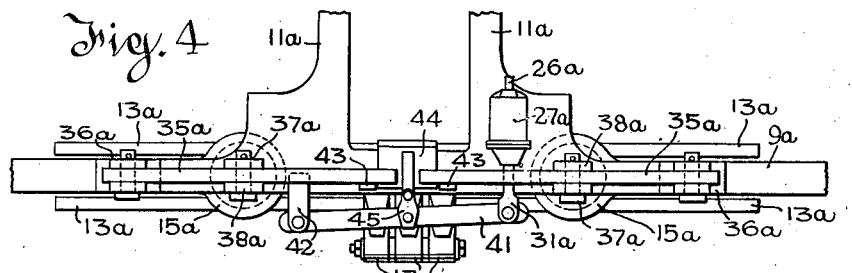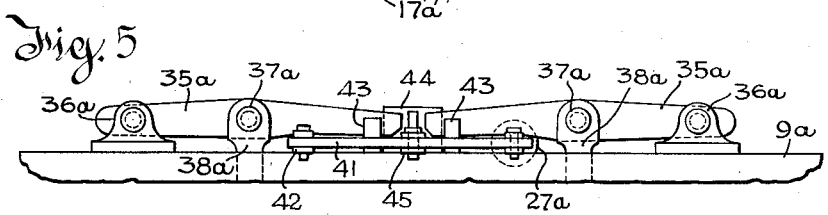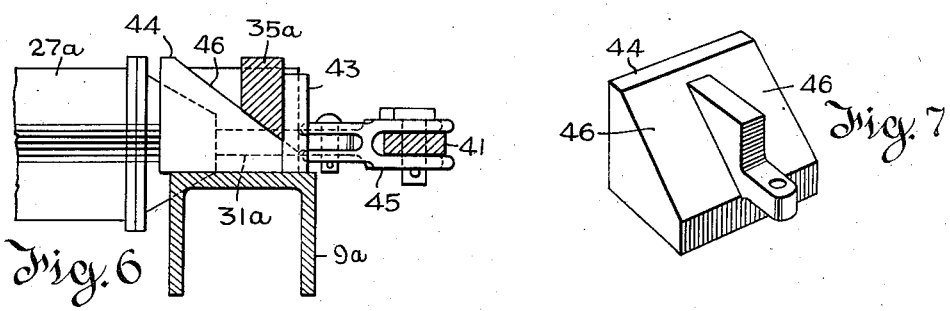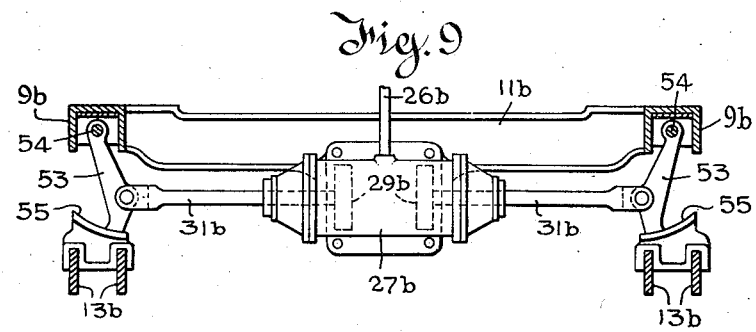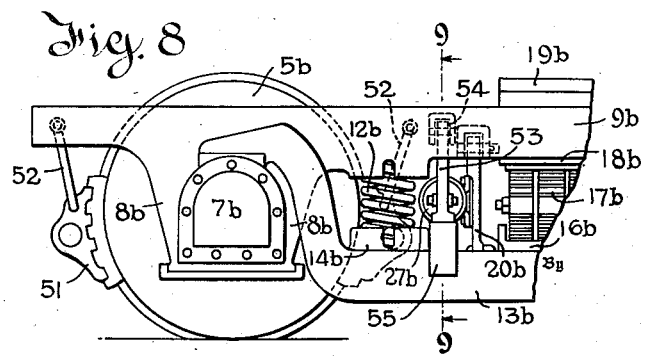

Patented June 17, 1941

2,245,864

UNITED STATES PATENT OFFICE 2,245,864

RAILWAY CAR TRUCK

Alton W. Laird, Watertown, N. Y., assignor to The New York Air Brake Company, a corporation of New Jersey Application August 30, 1940, Serial No. 354,879

8 Claims. (Cl. 188—33)

This invention relates to railway brakes, particularly to brakes for high speed, light-weight passenger trains, and serves to control the relative positions assumed by sprung and unsprung railway car truck parts as an incident to application of the brakes and thus improve adhesion.

In the railway braking field there has been a departure from the former almost universal practice of operating brakes, usually clasp brakes, on the two trucks by a single brake cylinder on the car underframe.

At present at least one brake cylinder is mounted on each truck and operates brakes thereon. Installations using two and four cylinders per truck are also in use. In the recent past these cylinders operated clasp brakes which engaged the wheel treads. To avoid damage to the wheels and to secure other related advantages, disc and other types of off-the-tread brakes are being increasingly used and bid fair to supplant the older type at least in those high speed railway services where the braking requirements are particularly severe.

An unexpected and heretofore baffling factor in the use of disc and other off-the-tread brakes is a seeming reduction in adhesion evidenced by an increased tendency for wheel sliding to occur. Even on trains where the reduction in body weight is proportionally greater than the reduction in truck weight, wheels braked with off-the-tread brakes have a tendency to slide under braking ratios so low as to be well within limits heretofore considered, not merely safe, but markedly conservative.

For example, in one test on sanded rail the best adhesion with off-the-tread brakes at low speed was 17 per cent and at high speed 14 per cent. According to prior accepted standards from low speeds, adhesion was commonly taken at twenty-five per cent to forty per cent on sanded rail and this was invariably adequate to prevent the sliding of wheels at high speeds with retarding forces, such as those developed during the test in question. While this test probably represents an extreme case, any factor occasioning an apparent reduction of adhesion to half or less of former value (or indeed any reduction below former values) is a serious matter. Reasonable stopping distances from high speeds must be had if high speed trains are to operate safely and effectively on existing permanent way, and the distances attainable with brake shoes on the treads left something to be desired.

The present invention is based on the discovery that free spring action contributes to the difficulty when off-the-wheel-tread types of brakes supplant the familiar clasp brake design. Heretofore, upon each application of the brakes, the brake shoes, which are suspended from the spring supported truck frame, tended to clamp the wheels tightly and served to prevent vertical motion, particularly upward motion, of the truck frame with respect to the wheels during the brake application. This followed from the fact that the brake shoes were invariably located below the horizontal center line of the wheels. If unrestrained during a brake application, the spring-borne truck frame will oscillate upon the equalizer springs during brake applications, alternately increasing and decreasing the instantaneous weight borne by the wheels. The introduction of off-the-wheel-tread types of brake and the resulting removal of the damping effect afforded by the brake shoes as just described permits such oscillation to occur. The consequent momentary reductions of the force urging the wheels to continue rotation allow them to be "picked up" (i. e. locked by the brakes) during moments of reduced loading. Once a wheel stops or nearly stops rotating, the inherent loss of adhesion completes the cycle, so that sliding becomes self-perpetuating.

The solution is to arrest the relative vertical motion between truck frame and unsprung parts afforded by spring action, the preferred arrangement being to use motor means energized simultaneously with the brake cylinder to set the equalizing springs down "solid" (i. e. until their coils contact).

Basically the idea is to lock the spring supported truck frame to the unsprung equalizer bars in any convenient way. Setting the springs solid is preferred because it is simple and avoids shock effects.

For purpose of explanation several typical embodiments of the invention, as applied to a four-wheel truck having air operated brakes, will be described by reference to the accompanying drawings.

In the drawings—

Fig. 1 is a half plan of the truck having the invention applied.

Fig. 2 is a side elevation thereof.

Fig. 3 is a detail elevation of one of the four loading cylinders.

Figs. 4 and 5 are fragmentary views similar to portions of Figs. 1 and 2 respectively showing a modified arrangement requiring only two small loading cylinders per truck and using an irreversible wedge mechanism to perform the locking function.

Fig. 6 is a fragmentary view of one loading motor and wedge as used in Figs. 4 and 5.

Fig. 7 is a perspective view of the wedge shown in Figs. 4 to 6.

Fig. 8 is a view similar to a portion of Fig. 2 and showing a further modification in which the equalizer springs are locked against further compression, instead of being compressed as in the embodiments of Figs. 1–7.

Fig. 9 is a section transverse to the truck on the line 9—9 of Fig. 8.

Embodiment of Figs. 1 to 3

The wheels 5 are fast in pairs on axles 6 which turn in journal boxes 7. The journal boxes are confined between pedestals 8 formed integrally with the truck side frames 9. The side frames 9 are tied together with the usual cross members, some of which appear at 10 and 11. The truck frame is sustained on the boxes 7 by equalizer springs 12 and equalizer bars 13. Each bar 13 rests at its ends on the boxes and is offset downward between the boxes to receive the springs 12. Each bar has cup-like seats 14 for the lower ends of a pair of springs which are of the coil compression type. The side frame has opposed cup-like seats 15 for the upper ends of the springs.

The cross members 11 hingedly support the upper ends of vertical links, or hangers, 20 which carry the spring plank 16. The spring plank 16 carries elliptic springs 17, which in turn support the bolster 18, with its center bearing 19.

The truck above illustrated is chosen as a common type to which the invention is applicable. The details of its construction are not features of the invention, and the invention may be applied to a wide variety of trucks.

The brakes, while of a less familiar form, are also not a feature of the invention except that they are off-the-wheel-tread brakes operated by cylinders mounted in the truck and offer no material resistance to truck-spring action. The discs 21 are fast on axles 6, and when the brakes are applied are clamped between brake shoes 22, which are in pairs, the shoes of each pair engaging opposite sides of the discs. The shoes are carried by and actuated through pairs of levers 23, which are fulcrumed at 24 on members carried by the truck frame. The other ends of levers 23 are forced apart to apply the brakes by pistons in cylinders 25. Supporting means for the fulcra 24 and cylinders 25 are indicated on the drawings but do not require detailed description.

Operating air is supplied to the brake cylinders through pipes 26, one at each side of the truck. Branches of these pipes lead to the upper or head ends of stabilizing cylinders 27, each mounted on a bracket 28, at an end of the truck frame. Each cylinder 27 has a piston 29 and rod 31, connected by yokes 32, 33 and rods 34 with the outer end of a corresponding stabilizing lever 35.

The stabilizing levers 35 are fulcrumed on brackets 36 mounted on top of the side frames 9. The inner ends of levers 35 are pinned at 37 to the upper ends of links 38, which extend through slots in the side frames 9 and equalizer bars 13, at the seats 15 and 14, and also through a corresponding spring 12. Beneath the equalizer bar 13 each link 38 carries a clip 39 capable of reacting upward on the equalizer bar.

The levers 35 multiply the force developed by the cylinders 27, and the parts are so dimensioned that the cylinders 27, when subjected to somewhat less than full braking pressure, set the springs 12 solid. In lieu of setting the springs solid, other means, such as stops distinct from the springs, may be used to limit the approach of the equalizer bar and side frame. Since the springs set up gradually rather than suddenly, it is preferred to close the springs solid and let them serve as the stops. Actually the cylinders 27, when active, draw the truck frame downward through the full range of equalizer spring action, and by terminating free spring action prevent the oscillation which heretofore has initiated wheel sliding.

Embodiment of Figs. 4–7

Various equivalent arrangements may be devised, and one is shown in Figs. 4 to 7, in which parts similar to those shown in Figs. 1 to 3 are given similar reference numerals with the distinguishing letter a.

The truck side frames appear at 9a and cross members at 11a. Two loading cylinders, one at each side of the truck, are used and one appears at 27a. The pipe 26a connects with a brake cylinder pipe as in Figs. 1 and 2, but the brake cylinders are not illustrated. The levers 35a, two on each side frame, are pivoted to brackets 36a at their outer ends and when the inner ends of the levers 35a are forced upward, as they are during a brake application, the links 38a (identical in function with the links 38) are drawn upward, since they are pinned at 37a to the levers 35a.

A wedge motion transmitting mechanism is interposed between loading cylinder 27a and the inner ends of a pair of levers 35a. The piston rod 31a is pinned to one end of a lever 41 whose other end is fulcrumed in bracket 42 carried by side frame 9a. A pair of upstanding guide lugs 43 not only prevent outward displacement of levers 35a but also confine and guide in horizontal motion transverse to frame 9a a wedge block 44. The block 44 is connected by a link 45 to a point on lever 41 at about mid length thereof so that when cylinder 27a is put under pressure during a brake application, block 44 is drawn outward, causing the inclined surfaces 46 on the block to react on similarly inclined faces in the inner ends of levers 35a and force the ends of the levers upward, closing the equalizer springs.

The principle of operation is the same as that previously described, but the friction of the wedge surfaces makes the action irreversible, or substantially so, and permits the use of a rather small cylinder. This and the possibility of using two cylinders instead of four somewhat reduces the consumption of air.

Embodiment of Figs. 8 and 9

Both embodiments so far described contemplate closing the equalizer springs, but a similar effect of stabilizing the truck can be had by preventing compression of the equalizer springs. To do this some sort of strut member is interposed between the side frame and equalizer bar. In Figs. 8 and 9 two such strut members are set between the side frame and corresponding end portions of the equalizer bar, and exercise a wedging action upon arcuate seats which the struts engage when active.

This last scheme can be used with off-the-tread brakes such as shown in Figs. 1 to 7. However, because it has special utility with conventional clasp brakes, these are shown in Figs. 8 and 9. In these figures parts corresponding to parts in Figs. 1 to 3 are given the same reference numerals with the distinguishing letter b.

One of the four wheels is shown at 5b and one of the journal boxes at 7b. It is mounted between pedestals 8b forming a part of the side frame 9b. There are cross members, certain of which appear at 11b, equalizer springs 12b and equalizer bar 13b, all arranged exactly as shown in Fig. 2 except that there are no loading bars, such as the bars 38, extending through the equalizer springs. The spring plank, elliptic springs, bolster and center bearing are all arranged as shown in Fig. 2 and require no further description, the same reference numerals accompanied by the letter b being applied wherever possible.

Instead of the disc brakes shown in Figs. 1 and 2, ordinary clasp brakes are used, one brake shoe appearing at 51. The usual brake shoe hangers 52 are used. Brake cylinders are not illustrated as it is immaterial how the brake cylinder is arranged. Ordinarily there would be one, or at most two, truck mounted brake cylinders. The important point to observe is that, as in commercial practise, the brake shoe 51 is centered below the center of the wheel 5b with which it coacts, so that when the brakes are applied the tendency is to increase the load on the equalizer springs 12b. As a matter of fact, with ordinary braking pressures the brakes apply a substantial collapsing stress to the equalizing spring 12b. Suspended beneath the cross member 11b, as indicated in Fig. 9, is a loading cylinder 27b which is shown as of the double-ended type, that is it has two pistons 29b between which the actuating air is admitted through the pipe 26b. These pistons are connected to rods 31b which work through guides in the opposite ends of the cylinder 27b. It will be understood that the pipe 26b is connected to the brake cylinder pipe so that the pistons will be forced outward whenever the brakes are applied. The rods 31b are connected to corresponding ones of a pair of strut links 53. Each link of the pair is pivoted at 54 to the side frames 9b and so arranged that when the piston rods 31b are forced outward the lower ends of the links 53 coact with the arcuate thrust plates 55 which are carried by the equalizer bars 13b. Thus, as an incident to an application of the brake, the strut links are moved outward to immobilize, or substantially immobilize, the equalizer bars so far as relative movement with respect to the side frames is concerned. The parts are so arranged that the strut links become effective before the brake application develops much effect. It follows that the truck is stabilized before the disturbing forces are initiated.

In all three embodiments of the invention the effect is to stabilize the truck frame with respect to the equalizer bar. Two different modes of bringing about this result are disclosed, one involving collapsing of the equalizer springs until they set solid, and the other involving the use of struts which supplant the springs and substitute a rigid support for the yielding support normally offered by the springs. The latter of the two schemes is available for off-the-tread brakes as well as conventional brake shoes acting on the tread in connection with the latter type of truck. Such an arrangement is advantageous because it resists the loading tendency which is exerted by the brake shoes when applied in the conventional manner on the lower portions of the wheels. All the embodiments, however, have in common the idea of stabilizing the truck, particularly with respect to the equalizer bar, in such a way as to prevent oscillation and consequent variation of wheel loading. As explained, such variation of wheel loading is the cause, or at any rate one of the causes, of apparent losses of adhesion during braking. Stabilization of the truck therefore materially improves the performance of the brake and permits the attainment of reasonable stopping devices with trucks whose spring characteristics are good under normal running conditions. The spring action is somewhat impaired during brake application, but this effect is required to preserve normal adhesion.

While three specifically different embodiments of the invention have been described in considerable detail, these embodiments are intended to be illustrative and not limiting and the scope of the invention is defined solely in the claims.

What is claimed is:

1. The combination of a railway car truck having wheels with journal boxes, a frame and a spring suspension interposed between the frame and journal boxes, and including equalizer bars and equalizer springs; fluid pressure brakes including at least one brake cylinder mounted on the truck; and means distinct from the brakes and operable as an incident to a brake application serving to immobilize said frame as to motion relatively to said journal boxes.

2. The combination defined in claim 1 in which the equalizer bars are sustained directly by the journal boxes, the equalizer springs are interposed between the equalizer bars and said frame, and the immobilizing means serves to fix the equalizer bars relatively to the frame.

3. The combination of a railway car truck having wheels with journal boxes, a frame and a spring suspension interposed between the frame and journal boxes, and including equalizer bars and equalizer springs; fluid pressure brakes including at least one brake cylinder mounted on the truck; and motor means automatically operable as an incident to a brake application and serving to load said equalizer springs until they are closed to the limit of their spring action.

4. The combination of a truck comprising wheels with journal boxes, a frame and a spring suspension comprising equalizer bars supported by said journal boxes and equalizer springs interposed between said bars and said frame; fluid pressure brakes including at least one brake cylinder mounted on the truck; and means automatically operable as an incident to a brake application and then serving to develop a force reaction between said frame and equalizer bar sufficient to load said springs until they are closed to the limit of their spring action.

5. The combination defined in claim 4 in which the means automatically operable as an incident to a brake application comprise expansible chamber motors connected to be subjected to brake cylinder pressure.

6. The combination of a railway car truck having wheels with journal boxes, a frame, and a spring suspension interposed between the frame and journal boxes, and including equalizer bars and equalizer springs; fluid pressure brakes including at least one brake cylinder mounted on the truck; and a plurality of fluid pressure motors all subject to brake cylinder pressure and each serving when subjected to pressure to suppress motion of a corresponding journal box relatively to said truck frame.

7. The combination defined in claim 6 in which the motors serve to collapse the equalizer springs to the limit of their spring action.

8. The combination with the structure defined in claim 6 in which load sustaining means are connected to be shifted by said motors from inactive positions when the motors are vented to active positions when the motors are under pressure, said sustaining means serving to support said frame independently of said spring suspension.

ALTON W. LAIRD.